(12) United States Patent
Benhammadi et al.

(10) Patent No.: US 11,550,744 B2
(45) Date of Patent: Jan. 10, 2023

(54) INTERRUPT CONTROLLER AND METHOD OF MANAGING AN INTERRUPT CONTROLLER

(71) Applicants: STMicroelectronics (Alps) SAS, Grenoble (FR); STMicroelectronics (Grenoble 2) SAS, Grenoble (FR)

(72) Inventors: Jawad Benhammadi, Pont de Claix (FR); Sylvain Meyer, Grenoble (FR)

(73) Assignees: STMicroelectronics (Alps) SAS, Grenoble (FR); STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 17/229,307

(22) Filed: Apr. 13, 2021

(65) Prior Publication Data
US 2021/0318972 A1    Oct. 14, 2021

(30) Foreign Application Priority Data

Apr. 14, 2020  (FR) ...................................... 2003733

(51) Int. Cl.
| | |
|---|---|
| *G06F 13/24* | (2006.01) |
| *G06F 13/16* | (2006.01) |
| *G06F 21/85* | (2013.01) |
| *H03K 19/20* | (2006.01) |
| *G06F 1/3237* | (2019.01) |

(52) U.S. Cl.
CPC ............ *G06F 13/24* (2013.01); *G06F 1/3237* (2013.01); *G06F 13/1689* (2013.01); *G06F 21/85* (2013.01); *H03K 19/20* (2013.01)

(58) Field of Classification Search
CPC ...... G06F 13/24; G06F 13/1689; G06F 21/85; G06F 1/3237; H03K 19/20
See application file for complete search history.

(56) References Cited

U.S. PATENT DOCUMENTS

| | | | | |
|---|---|---|---|---|
| 2001/0054128 A1* | 12/2001 | Sezaki | ................ | G06F 15/7814 711/167 |
| 2002/0053927 A1* | 5/2002 | Stevens | ................... | G06F 13/24 326/93 |

(Continued)

FOREIGN PATENT DOCUMENTS

KR    20000020265 A * 4/2000 ............... G06F 9/46

OTHER PUBLICATIONS

Korean Patent Office machine translation of KR20000020265A (Year: 2000).*

*Primary Examiner* — Glenn A. Auve
(74) *Attorney, Agent, or Firm* — Slater Matsil, LLP (57) ABSTRACT

In accordance with an embodiment, an electronic device includes: an interrupt controller having an input for receiving a controller clock signal, and an output, the interrupt controller configured to deliver an output interrupt signal on the output when the controller clock signal is active, and a control circuit comprising, an input interface for receiving at least one interrupt signal from at least one item of equipment external to the device, a clock input for receiving an external clock signal, and a first controller connected to the input interface and to the clock input, the first controller configured to automatically generate the controller clock signal from the external clock signal from when the at least one interrupt signal is asserted until a delivery of a corresponding output interrupt signal.

20 Claims, 3 Drawing Sheets

(56) References Cited

U.S. PATENT DOCUMENTS

| | | |
|---|---|---|
| 2004/0199694 A1 | 10/2004 | Yiu et al. |
| 2007/0143515 A1* | 6/2007 | Kershaw ................. G06F 21/52 710/264 |
| 2013/0179710 A1 | 7/2013 | Chang et al. |
| 2014/0089708 A1* | 3/2014 | Menard ................. G06F 1/3203 713/323 |
| 2014/0310540 A1 | 10/2014 | Herbeck |
| 2015/0227400 A1 | 8/2015 | Yamashita et al. |
| 2018/0217630 A1* | 8/2018 | Soni .......................... G06F 1/12 |
| 2019/0079573 A1 | 3/2019 | Hanson et al. |

* cited by examiner

INTERRUPT CONTROLLER AND METHOD OF MANAGING AN INTERRUPT CONTROLLER

CROSS-REFERENCE TO RELATED APPLICATIONS

This application claims the benefit of French Patent Application No. 2003733, filed on Apr. 14, 2020, which application is hereby incorporated herein by reference in its entirety.

TECHNICAL FIELD

Embodiments and implementations of the invention relate to an interrupt controller and a method of managing an interrupt controller.

BACKGROUND

Conventionally, an interrupt controller is configured to receive interrupt signals emanating from one or more external items of equipment. The interrupt signals are emitted by the external item(s) of equipment when same want to signal to a processing core, for example a microprocessor, a particular event requiring for example a particular action on the part of the processing core. The interrupt controller then manages the receipt of intercept signals in order, for example, to serialize same and transmit same sequentially to the processing core.

Some microcontrollers may be secure, that is to say include a secure domain. The secure domain may include a processing core including a secure processing core, comprising a secure program code, and secure equipment that must for example only be accessed by the secure processing core. However, such a microcontroller may also include an unsecure domain. The unsecure domain may include an unsecure processing core comprising an unsecure program code and unsecure equipment.

It is possible during the operation of the microcontroller that the unsecure processing core attempts to access, during the execution of the unsecure program code thereof, a secure item of equipment. This results in a safety fault that will be translated by the emission of an interrupt signal from the external equipment towards the interrupt controller in view of being transmitted to the secure processing core. And in such a secure application, it is important that the interrupt controller does not miss any safety fault.

In this regard, it is currently provided to operate the interrupt controller continuously, that is to say continuously deliver thereto a clock signal. Yet this is problematic when the microcontroller changes into a low consumption mode.

Therefore, there is a need to not penalize the consumption of the microcontroller in a low consumption mode, whilst making sure that the interrupt controller effectively processes all of the interrupt signals received, for example safety fault signals, without omitting any thereof.

SUMMARY

In accordance with an embodiment, an electronic device includes: an interrupt controller having an input for receiving a controller clock signal, and an output, the interrupt controller configured to deliver an output interrupt signal on the output when the controller clock signal is active, and a control circuit comprising, an input interface for receiving at least one interrupt signal from at least one item of equipment external to the device, a clock input for receiving an external clock signal, and a first controller connected to the input interface and to the clock input, the first controller configured to automatically generate the controller clock signal from the external clock signal from when the at least one interrupt signal is asserted until a delivery of a corresponding output interrupt signal.

In accordance with another embodiment, a method for managing an interrupt controller includes: receiving at least one interrupt signal; receiving an external clock signal; generating a controller clock signal from the external clock signal from when the at least one interrupt signal is asserted until a delivery of a corresponding output interrupt signal; and providing the controller clock signal to an input of the interrupt controller, wherein the interrupt controller is configured to deliver the corresponding output interrupt signal upon receipt of the controller clock signal.

In accordance with a further embodiment, a circuit, includes: a gating control circuit having a first input, a second input configured to be coupled to an output of an interrupt controller, and an output configured to be coupled to an input of the interrupt controller, the gating control circuit configured to assert a gating control signal upon receipt of an asserted input interrupt signal at the first input, and to de-assert the gating control signal upon receipt of an asserted output interrupt signal at the second input; and a clock gating circuit having a control input coupled to the output of the gating control circuit, a clock input configured to receive an input clock signal, and an output configured to provide a gated clock signal to the input of the interrupt controller.

BRIEF DESCRIPTION OF THE DRAWINGS

Other advantages and features of the invention will become apparent upon examination of the following detailed description of non-limiting embodiments and implementations, and of the appended drawings, wherein.

DETAILED DESCRIPTION OF ILLUSTRATIVE EMBODIMENTS

Some embodiments and implementations of the invention relate to interrupt controllers, in particular the management of the operation thereof, and particularly interrupt controllers incorporated within secure microcontrollers configured to process safety fault signals.

Figure 1:
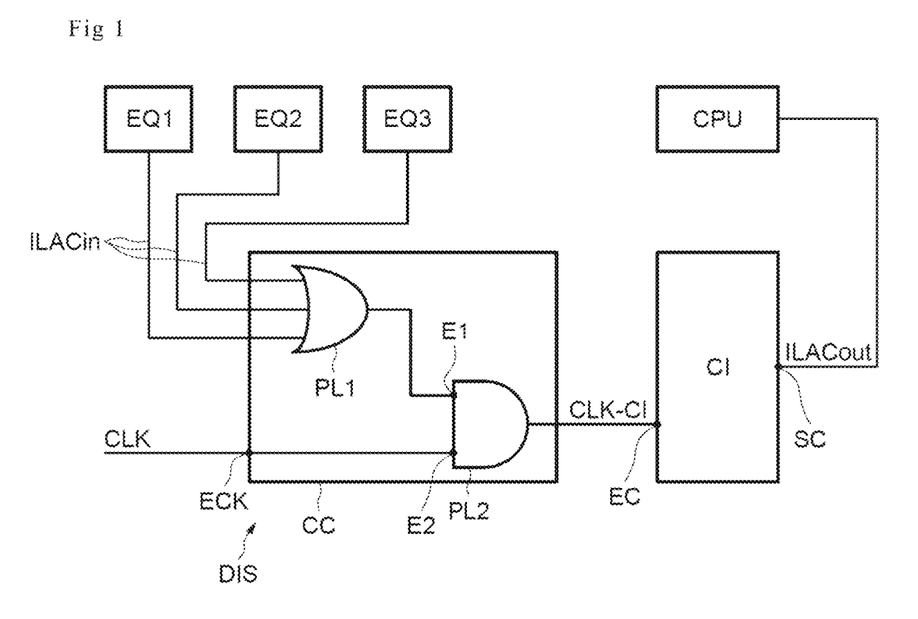
FIG. 1 illustrates a block diagram showing an embodiment of an electronic device.

FIG. 1 illustrates a block diagram showing one embodiment of an electronic device DIS comprising an interrupt controller CI linked to a control circuit CC.

According to one aspect, electronic device, includes: an interrupt controller possessing an input for receiving a controller clock signal, an output and configured to deliver an output interrupt signal on the output in the presence of the controller clock signal, and a control circuit possessing, an input interface for receiving at least one interrupt signal likely to emanate from at least one item of equipment external to the device, a clock input for receiving an external clock signal, and a controller connected to the input interface and to the clock input and configured to automatically generate the controller clock signal from the external clock signal in presence of the at least one interrupt signal and until a delivery of the corresponding output interrupt signal.

In other terms, according to this aspect, it is delivered automatically that is to say without it being necessary for a user to program anything, the external clock signal (and therefore the controller clock signal) to the interrupt controller, which will enable same to deliver the output interrupt signal, intended for example for a processor, and the delivery of the controller clock signal is stopped as soon as the output interrupt signal has been delivered.

Thus, thanks to the control circuit, the interrupt controller receives the clock signal that forms the controller clock over a period between: the receipt of the interrupt signal by the control circuit and the delivery of the corresponding output interrupt signal by the interrupt controller. Therefore, no interrupt signal is omitted whilst limiting the consumption of the interrupt controller.

According to one embodiment, the input interface is configured to receive a plurality of interrupt signals respectively likely to emanate from a plurality of different external items of equipment and the controller is configured to automatically generate the controller clock signal from the external clock signal in presence of one at least of the interrupt signals.

Thus, the input interface may receive a plurality of interrupt signals which enables the controller to generate the controller clock signal for each interrupt signal received by the input interface.

For example, the input interface includes an OR gate whereof the inputs are configured to receive the different interrupt signals, and whereof the output is connected to the controller. Indeed, each input of the OR gate may be connected to a different external item of equipment. Thus, if only one interrupt signal is received by only one of the inputs of the OR gate of the input interface, then the output of the OR gate emits a signal enabling the controller to generate the controller clock signal.

According to one embodiment, the controller includes logic possessing first input connected to the input interface and second input connected to the clock input and configured to control by gating the external clock signal to automatically generate or not the controller clock signal by non-interruption or interruption of the external clock signal.

Thus, the controller clock signal is generated from the external clock signal, and therefore the logic makes it possible to not interrupt or to interrupt the controller clock signal by controlling by external clock signal gate (this technique is usually called "Clock Gating"). For example, the logic includes an AND gate coupled to the first input and the second input.

Some interrupt controllers may generate the output interrupt signal in one cycle of the controller clock signal. Other interrupt controllers require a plurality of cycles of the controller clock signal to generate the output interrupt signal.

According to one embodiment, wherein the interrupt controller is configured to deliver the output interrupt signal in one cycle of the controller clock signal, and the first input of the logic is connected directly to the input interface, so as to deliver on the first input at least one interrupt signal authorizing the generation of the controller clock signal during the occurrence of the interrupt signal and inhibiting the delivery of the controller clock signal by interruption of the external clock signal after the occurrence of the interrupt signal.

Thus, the logic directly connected to the input interface makes it possible to automatically generate only one controller clock cycle.

According to one alternative embodiment, wherein the interrupt controller is configured to deliver the output interrupt signal in a plurality of cycles of the controller clock signal, the controller includes a control stage connected between the input interface, the first input of the logic and the output of the interrupt controller.

The control stage may be configured to deliver on the first input of the logic a logic signal authorizing the generation of the controller clock signal during the occurrence of at least one interrupt signal so long as the corresponding output interrupt signal has not been delivered and inhibiting the delivery of the controller clock signal by interruption of the external clock signal once that the output interrupt signal has been delivered.

Thus, the control stage makes it possible to wait for the output interrupt signal to be delivered, before interrupting the external clock signal. The controller clock signal is then generated during a number of cycles enabling the controller to deliver the output interrupt signal.

According to one embodiment, the control stage includes a memory, for example a latch, controlled by the external clock signal and configured to store in memory the presence of at least one interrupt signal until the generation of the output interrupt signal.

According to one embodiment, the control stage includes an AND gate having a first inverted input connected to the output of the interrupt controller and a second input connected to the output of the memory.

According to one embodiment, the interrupt controller is a secure interrupt controller and the at least one interrupt signal is at least one safety fault signal.

According to another aspect, it is proposed a microcontroller, comprising: an unsecure domain incorporating an unsecure processing core containing an unsecure program code, a secure domain incorporating at least one secure processing core containing a secure program code, a device such as described above, configured to deliver the possible output interrupt signal(s) to the secure processing core, and at least one unsecure item of equipment external to the device, and a control module associated with the at least one secure external item of equipment and configured to deliver the safety fault signal to the device in the event of an attempt to access the at least one secure item of equipment by the unsecure processing core.

According to another aspect, a method for managing an interrupt controller includes a receipt of at least one interrupt signal; a receipt of an external clock signal; a delivery of a controller clock signal on an input of the interrupt controller in presence of which the interrupt controller delivers an output interrupt signal. The controller clock signal may be automatically generated from the external clock signal in presence of the at least one interrupt signal and until the delivery of the output interrupt signal.

According to one implementation, the method comprises a receipt of a plurality of interrupt signals respectively and an automatic generation of the controller clock signal from the external clock signal in presence of one at least of the interrupt signals.

According to one implementation, the method comprises the generation or not of the controller clock signal comprises a control by gate of the external clock signal not interrupting or interrupting the external clock signal.

According to one implementation, the method comprises that the interrupt controller delivers the output interrupt signal in one cycle of the controller clock signal, and the controller clock signal is generated during the occurrence of an interrupt signal by not interrupting the external clock signal and the delivery of the controller clock signal is inhibited by interruption of the external clock signal after the occurrence of the interrupt signal.

According to one implementation, the method comprises that the interrupt controller delivers the output interrupt signal in a plurality of cycles of the controller clock signal, and the controller clock signal, by not interrupting the external clock signal, during the occurrence of at least one interrupt signal so long as the corresponding output interrupt signal has not been delivered and the delivery of the controller clock signal is inhibited by interruption of the external clock signal once that the output interrupt signal has been delivered.

The control circuit CC is configured to deliver or not a controller clock signal CLK-CI on an input EC of the interrupt controller CI, depending on the receipt or not of an interrupt signal ILACin coming from at least one of the external items of equipment EQ1, EQ2, EQ3, Following the receipt by the control circuit CC of an interrupt signal ILACin, the interrupt controller CI is capable, in the embodiment, of delivering, on an output SC, an output interrupt signal ILACout in only one cycle of the controller clock signal CLK-CI.

In this regard, the interrupt controller CI of the device may be for example of a similar type to an interrupt controller referenced STM32L5 within STMicroelectronics.

The output interrupt signal ILACout is subsequently intended to be for example delivered to a processing core CPU, such as a microprocessor.

Figure 5:
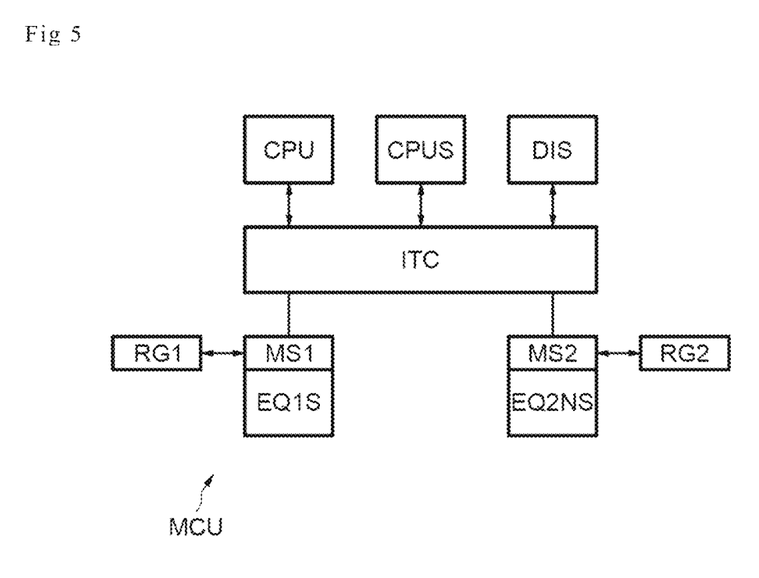
FIG. 5; illustrates a block diagram of embodiment microcontroller.

The processing core CPU may be a secure processing core configured to process interrupt signals emanating from secure equipment, such as safety faults. The embodiment illustrated by FIG. 5 is described hereafter.

If reference is made again to FIG. 1, it can be seen that the control circuit CC includes an input interface PL1 connected to the external equipment EQ1, EQ2, EQ3. It is understood therefrom that there may be any number of external items of equipment connected to the input interface of the control circuit CC.

At least one of the external items of equipment is configured to emit the interrupt signal ILACin that is received by the input interface of the control circuit CC. The input interface comprises here an OR gate, referenced PL1, whereof each input is connected to one of the external items of equipment EQ1, EQ2, EQ3.

Generally, the control circuit CC includes a controller for automatically generating the controller clock signal CLK-CI from an external clock signal CLK received on a clock input ECK of the control circuit CC, delivered for example by a quartz or a phase-locked loop, in presence of at least one interrupt signal ILACin.

In this regard, the controller includes logic, here an AND gate referenced PL2, whereof first input E1 is connected to the output of the OR gate PL1, and whereof a second input E2 is connected to the clock input ECK.

The output of the AND gate PL2 is connected to the input EC of the interrupt controller CI.

Figure 2:
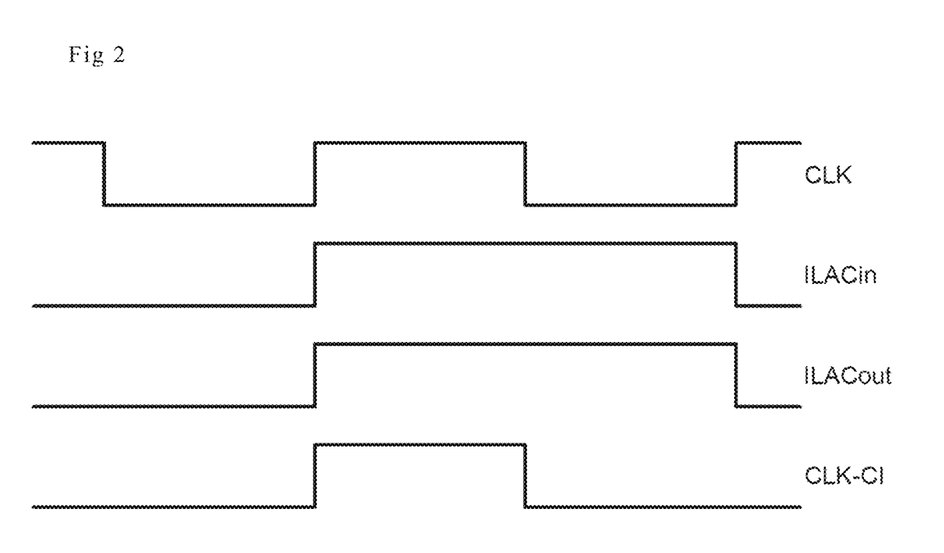
FIG. 2 illustrates a timing diagram according to of embodiment of FIG. 1.

Reference is now made more particularly to FIG. 2 that illustrates one implementation of a method according to the invention, in the form of a timing chart relative to the operation of a device DIS according to the embodiment described with reference to FIG. 1.

According to the implementation presented here, the interrupt circuit CI of the device DIS is capable of delivering an output interrupt signal ILACout in only one cycle of the controller clock signal CLK-CI after the receipt of an interrupt signal ILACin.

Steps of operating the device DIS are disclosed hereafter.

The external clock signal CLK is received by the clock input ECK of the control circuit CC as soon as the device DIS is in operation. The external clock signal is therefore delivered continuously to the second input E2 of the AND gate PL2.

The device DIS being in operation, an interrupt signal ILACin may be received by the control circuit CC.

Here a presence of an interrupt signal emitted by one of the external items of equipment is translated by a pulse at the high state of the signal ILACin whereas an absence of interrupt signal is translated by a low state of the signal ILACin. The interrupt signal ILACin is received on one of the inputs of the input interface PL1 of the control circuit CC.

Once the interrupt signal ILACin has been received, it is transmitted directly to the first input E1 of the AND gate PL2.

The logic, here the AND gate PL2, automatically carry out a non-interruption or an interruption of the external clock signal CLK (the technique is usually called "Clock Gating") respectively in presence or in absence of the interrupt signal ILACin, so as to generate or not, automatically the controller clock signal CLK-CI.

When the output interrupt signal ILACout has been emitted, the signal falls back to the low state, which coincides with the fallback to the low state of the interrupt signal ILACin and therefore to the interruption of the external clock signal CLK, since the signal ILACout is generated in one cycle of the controller clock signal CLK-CI.

In other terms, the controller clock signal CLK-CI is automatically generated from the external clock signal CLK in presence of the interrupt signal ILACin and until the delivery of the corresponding output interrupt signal.

Figure 3:
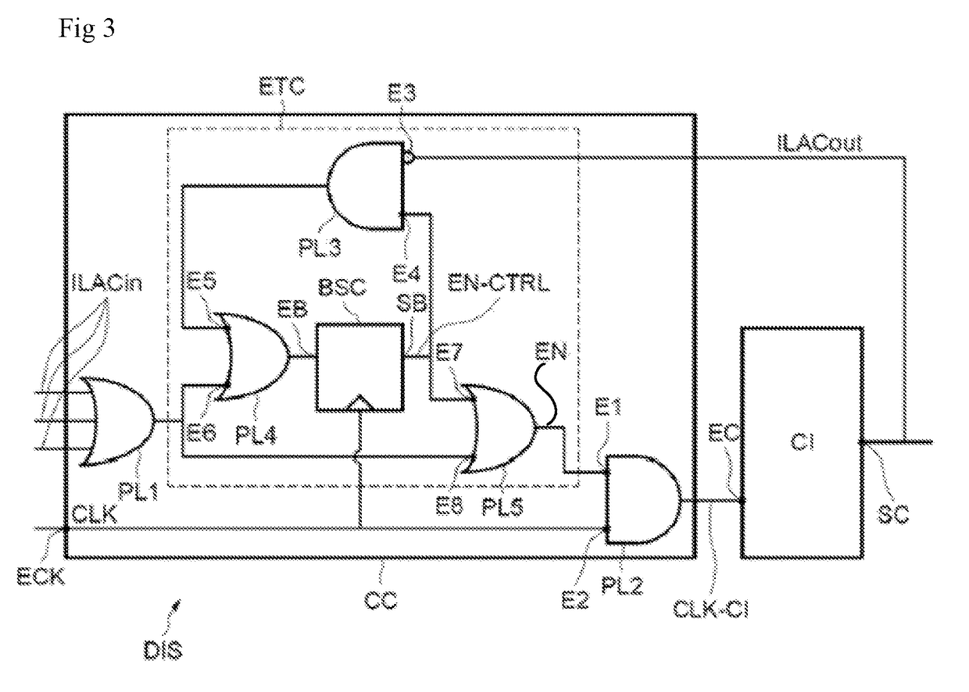
FIG. 3 illustrates a block diagram showing an embodiment of an electronic device.

FIG. 3 illustrates a block diagram showing one embodiment of an electronic device comprising an interrupt controller CI linked to the control circuit CC, but configured in the embodiment to deliver on the output SCle the output interrupt signal ILACout after a plurality of cycles of the controller clock signal CLK-CI.

In relation to the embodiment in FIG. 1, the controller of the control circuit CC include, apart from the logic gate PL2, a control stage ETC connected between an output of input interface PL1, here an output of the OR gate referenced PL1, and the first input E1 of the AND gate referenced PL2.

In an embodiment, the control stage ETC is configured, on the one hand, to store in memory the presence of an interrupt signal ILACin emanating from an external item of equipment, until the delivery of the corresponding output interrupt signal ILACout, and on the other hand, to deliver on the first input of the gate PL2, a logic signal EN authorizing the gate PL2 to deliver the controller clock signal CLK-CI, depending on the presence of the interrupt signal ILACin and on the storage in memory of the interrupt signal ILACin.

In this regard, the control stage ETC includes a memory BSC, here a latch, making it possible to store in memory the presence of the interrupt signal ILACin. The memory is set to the rate of the external clock signal CLK.

In addition, the control stage ETC is connected by a feedback loop to the output SC of the interrupt controller CI.

More specifically, the control stage ETC includes an AND gate, referenced PL3, having a first inverted input connected to the output SC of the interrupt controller CI. A second input E4 of the AND gate PL3 is connected to an output SB of the memory BSC.

The output SB of the latch BSC delivers the signal EN-CTRL.

An output of the AND gate PL3, is connected to a first input E5 of a first OR gate, referenced PL4.

A second input E6 of the first OR gate PL4 is connected to the output of the input interface PL1. An output of the second first OR gate PL4 is connected to an input EB of the memory BSC.

A first input E7 of a second OR gate, referenced PL5, is connected to the output SB of the memory BSC and a second input E8 of the second OR gate PL5 is connected to the output of the input interface PL1. An output of the second OR gate PL5 is connected to the first input E1 of the AND gate PL2.

Thus, the control stage delivers the logic signal EN on the first input E1 of the AND gate PL2.

So long as the logic signal EN is at the high state, the gate PL2 does not interrupt the external clock signal CLK, which makes it possible to generate the controller clock signal CLK-CI of the interrupt controller CI.

When the logic signal EN is at the low state, the gate PL2 then interrupts the external clock signal CLK inhibiting the delivery of the controller clock signal CLK-CI.

Figure 4:
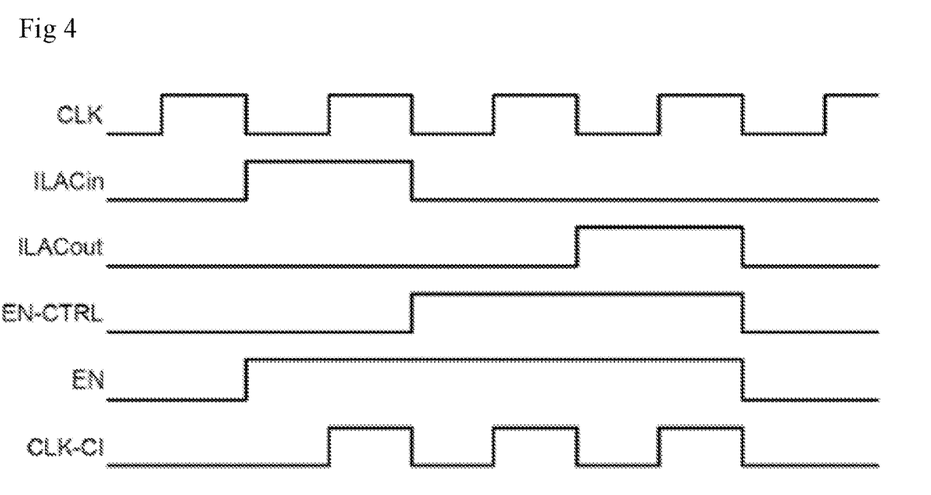
FIG. 4 illustrates a timing diagram according to of embodiment of FIG. 3.

Reference is now made more particularly to FIG. 4 that illustrates another implementation of a method according to the invention, in the form of a timing chart relative to the operation of a device according to the embodiment described with reference to FIG. 3.

According to the implementation presented here, the interrupt circuit CI delivers an output interrupt signal ILACout, after a plurality of cycles of a controller clock signal CLK-CI.

Steps of operating the device DIS are disclosed hereafter.

The external clock signal CLK is received by the clock input ECK of the control circuit CC as soon as the device DIS is in operation. The external clock signal is delivered continuously to the second input E2 of the AND gate PL2.

An interrupt signal ILACin may be received by the control circuit CC.

There again a presence of an interrupt signal emitted by one of the external items of equipment is translated by a pulse at the high state of the signal ILACin whereas an absence of interrupt signal is translated by a low state of the signal.

When the interrupt signal ILACin is received by the input interface (high state of the signal ILACin), the logic signal EN changes to the high state on the output of the OR gate PL5.

After one cycle of the external clock signal CLK the memory BSC stores in memory the presence of the interrupt signal ILACin, and the signal EN-CTRL changes to the high state whereas the interrupt signal ILACin falls back to the low state.

Moreover, since the output interrupt signal ILACout is not yet delivered, the inverting input E3 of the gate PL3 is at the high state, in the same way as the input E4.

The output of the gate PL3 is at the high state which maintains the input EB of the latch BSC at the high state.

The signal EN remains at the high state, not leading to an interruption of the external clock signal CLK despite the absence of the interrupt signal ILACin.

Subsequently, the interrupt controller CI delivers the output interrupt signal ILACout after a plurality of controller clock cycles. The output interrupt signal ILACout is received by the inverting input of the AND gate PL3 that then changes to the low state.

The input EB of the latch BSC then changes to the low state and the signal EN-CTRL changes to the low state a clock cycle CLK later coinciding with the fallback to the low state of the signal ILACout, and leading to the change to the low state of the signal EN and therefore to an interruption of the external clock signal CLK by the AND gate PL2.

The controller clock signal CLK-CI is generated throughout the entire time during which the logic signal EN is at the high state.

The logic signal EN is at the high state since the occurrence of the interrupt signal ILACin and so long as the corresponding output interrupt signal ILACout has not been delivered.

In other terms, there again, the controller clock signal CLK-CI is automatically generated from the external clock signal CLK in presence of interrupt signal ILACin and until the delivery of the corresponding output interrupt signal.

FIG. 5 illustrates a microcontroller MCU including in particular an unsecure domain and a secure domain.

The microcontroller may be of the family of microcontrollers referenced STM32 within STMicroelectronics.

The unsecure domain incorporates here for example an unsecure processing core CPU, such as a microprocessor, containing an unsecure program code as well as an unsecure item of equipment EQ2NS (only one unsecure item of equipment has been shown for reasons of simplicity but a plurality of unsecure items of equipment may of course be provided for).

The secure domain incorporates at least one secure processing core CPUS containing a secure program code in the same way as the device DIS described with reference to FIG. 1 or to FIG. 3 and incorporating the interrupt controller considered as secure.

The secure domain also includes a secure external item of equipment EQ1S (only one secure item of equipment has been shown for reasons of simplicity but a plurality of secure items of equipment may of course be provided for).

The processing cores CPU, CPUS, the device DIS and the secure or unsecure external items of equipment are interconnected by an interconnection network ITC of conventional structure and known per se.

With each secure or unsecure item of equipment is associated a control module MS1, MS2 as well as a register RG1, RG2 configured to contain information indicating if the corresponding item of equipment is secure or not.

The control module MS1 is configured to deliver a safety fault signal (interrupt signal) in the event of an attempt to access by the unsecure processing core CPU the first external secure item of equipment EQ1S.

Indeed, the control module MS1 will compare the content of the register RG1 with a field of the transaction intended for the item of equipment EQ1S, the field containing an indication representative of an unsecure transaction. The safety fault emitted is sent to the device DIS. The secure interrupt controller of the device subsequently delivers an output interrupt signal to the secure processing core CPUS.

What is claimed is:

1. An electronic device, comprising:
an interrupt controller having an input for receiving a controller clock signal, and an output, the interrupt controller configured to deliver an output interrupt signal on the output when the controller clock signal is active, and
a control circuit comprising, an input interface for receiving at least one interrupt signal from at least one item of equipment external to the device, a clock input for receiving an external clock signal, and a first controller connected to the input interface and to the clock input, the first controller configured to automatically generate the controller clock signal from the external clock signal from when the at least one interrupt signal is asserted until a delivery of a corresponding output interrupt signal.

2. The device according to claim 1, wherein the input interface is configured to receive a plurality of interrupt signals respectively from a plurality of different external items of equipment and the first controller is configured to automatically generate the controller clock signal from the external clock signal in a presence of one at least of the plurality of interrupt signals.

3. The device according to claim 2, wherein the input interface includes an OR gate having inputs configured to receive the plurality of interrupt signals, and an output connected to the first controller.

4. The device according to claim 1, wherein the first controller includes logic comprising a first input connected to the input interface and a second input connected to the clock input, the logic configured to gate the external clock signal to automatically generate the controller clock signal by non-interruption of the external clock signal and to automatically not generate the controller clock signal by interruption of the external clock signal.

5. The device according to claim 4, wherein the logic includes an AND gate having inputs coupled to the first input and the second input.

6. The device according to claim 4, wherein:
the interrupt controller is configured to deliver the output interrupt signal in one cycle of the controller clock signal;
the first input of the logic is connected directly to the input interface; and
the logic is configured to deliver on the first input of the logic at least one interrupt signal authorizing the generation of the controller clock signal when the at least one interrupt signal is asserted, and to inhibit the delivery of the controller clock signal by the interruption of the external clock signal after the at least one interrupt signal is de-asserted.

7. The device according to claim 4, wherein:
the interrupt controller is configured to deliver the output interrupt signal during a plurality of cycles of the controller clock signal; and
the first controller further includes a control stage connected to the input interface, the first input of the logic and the output of the interrupt controller,
the control stage is configured to:
deliver on the first input of the logic a logic signal authorizing the generation of the controller clock signal when the at least one interrupt signal is asserted so long as the corresponding output interrupt signal has not been delivered, and
inhibit the delivery of the controller clock signal by interrupting the external clock signal once the output interrupt signal has been delivered.

8. The device according to claim 7, wherein the control stage includes a memory controlled by the external clock signal and configured to store a value indicating a presence of at least one interrupt signal until the output interrupt signal is generated.

9. The device according to claim 8, wherein the control stage includes an AND gate having a first inverted input connected to the output of the interrupt controller and a second input connected to an output of the memory.

10. The device according to claim 1, wherein the interrupt controller is a secure interrupt controller and the at least one interrupt signal is at least one safety fault signal.

11. A microcontroller, comprising:
an unsecure domain incorporating an unsecure processing core containing an unsecure program code;
a secure domain incorporating at least one secure processing core containing a secure program code, and a device according to claim 10 configured to deliver the output interrupt signal to the secure processing core; and
at least one secure item of equipment external to the device, wherein a control module is associated with the at least one secure external item of equipment and is configured to deliver the safety fault signal to the device in the event of an attempt to access the at least one secure item of equipment by the unsecure processing core.

12. A method for managing an interrupt controller, comprising:
receiving at least one interrupt signal;
receiving an external clock signal;
generating a controller clock signal from the external clock signal from when the at least one interrupt signal is asserted until a delivery of a corresponding output interrupt signal; and
providing the controller clock signal to an input of the interrupt controller, wherein the interrupt controller is configured to deliver the corresponding output interrupt signal upon receipt of the controller clock signal.

13. The method according to claim 12, comprising receiving a plurality of interrupt signals and automatically generating the controller clock signal from the external clock signal in the presence of at least one of the plurality of interrupt signals.

14. The method according to one claim 12, wherein the generating the controller clock signal comprising gating the external clock signal.

15. The method according to claim 14, wherein:
the interrupt controller is configured to deliver the output interrupt signal in one cycle of the controller clock signal; and
generating the controller clock signal comprising:
generating the controller clock signal during an occurrence of the at least one interrupt signal by not interrupting the external clock signal, and
inhibiting the external clock signal after the occurrence of the at least one interrupt signal.

16. The method according to claim 14, wherein:
the interrupt controller is configured to deliver the output interrupt signal after a plurality of cycles of the controller clock signal; and
generating the controller clock signal comprises not interrupting the external clock signal during an occurrence of the at least one interrupt signal by not interrupting the external clock signal as long as the interrupt controller has not delivered the corresponding output interrupt signal, and interrupting the external clock signal once the corresponding output interrupt signal has been delivered.

17. A circuit, comprising:
a gating control circuit having a first input, a second input configured to be coupled to an output of an interrupt controller, and an output configured to be coupled to an input of the interrupt controller, the gating control circuit configured to assert a gating control signal upon receipt of an asserted input interrupt signal at the first input, and to de-assert the gating control signal upon receipt of an asserted output interrupt signal at the second input; and
a clock gating circuit having a control input coupled to the output of the gating control circuit, a clock input configured to receive an input clock signal, and an output configured to provide a gated clock signal to the input of the interrupt controller.

18. The circuit of claim 17, further comprising the interrupt controller, wherein the interrupt controller is configured to assert the output interrupt signal in response to receiving the gated clock signal.

19. The circuit of claim 17, further comprising an input logic circuit comprising a plurality of interrupt inputs, and an output coupled to the first input of the gating control circuit.

20. The circuit of claim 19, wherein:
the input logic circuit comprises an OR gate;
the gating control circuit comprises a register; and
the clock gating circuit comprises an AND gate.

* * * * *